Oct. 15, 1968  A. B. HAWES  3,405,650
MONORAIL TRAIN
Filed Jan. 14, 1966  4 Sheets-Sheet 1
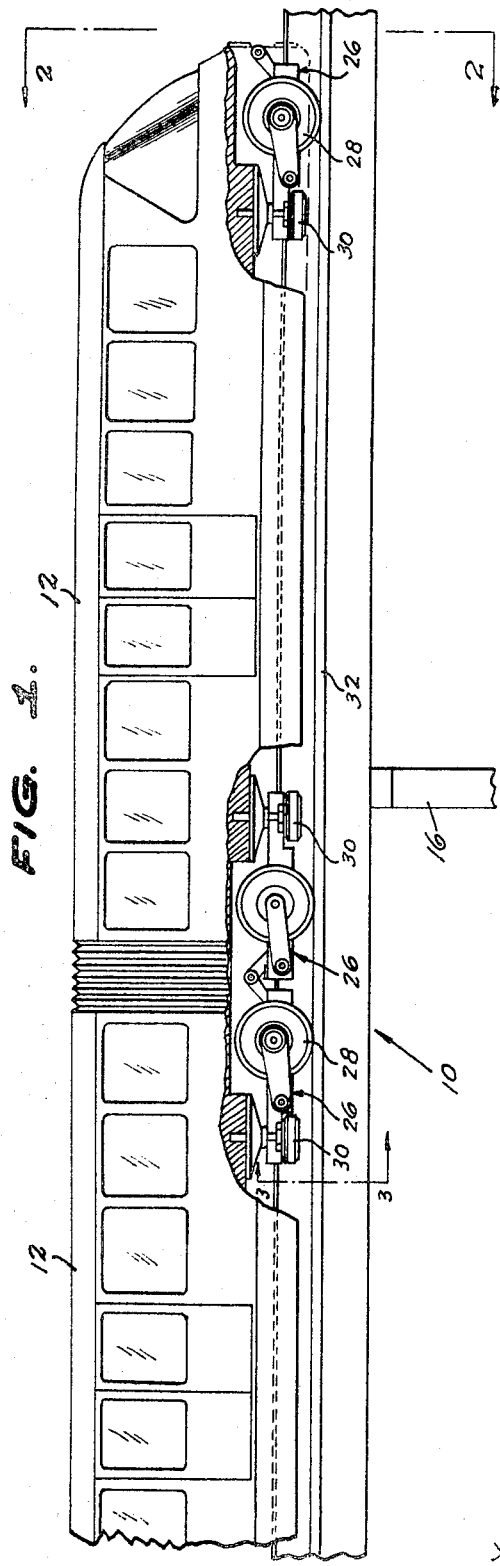
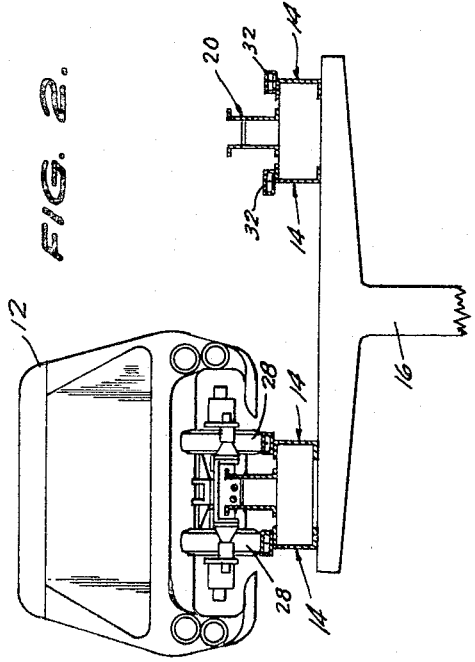
INVENTOR.
ALAN B. HAWES,
BY
Berman, Davidson & Berman
ATTORNEYS.

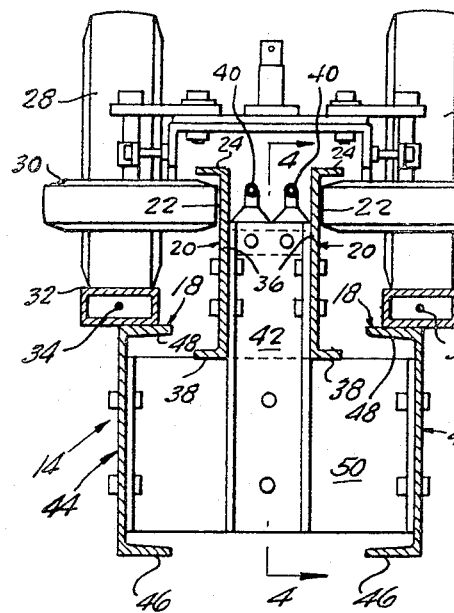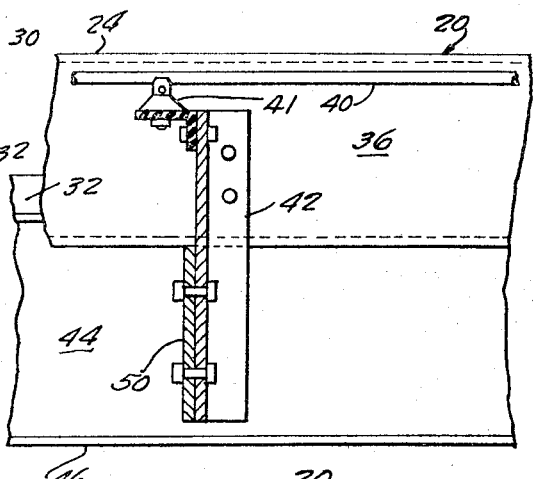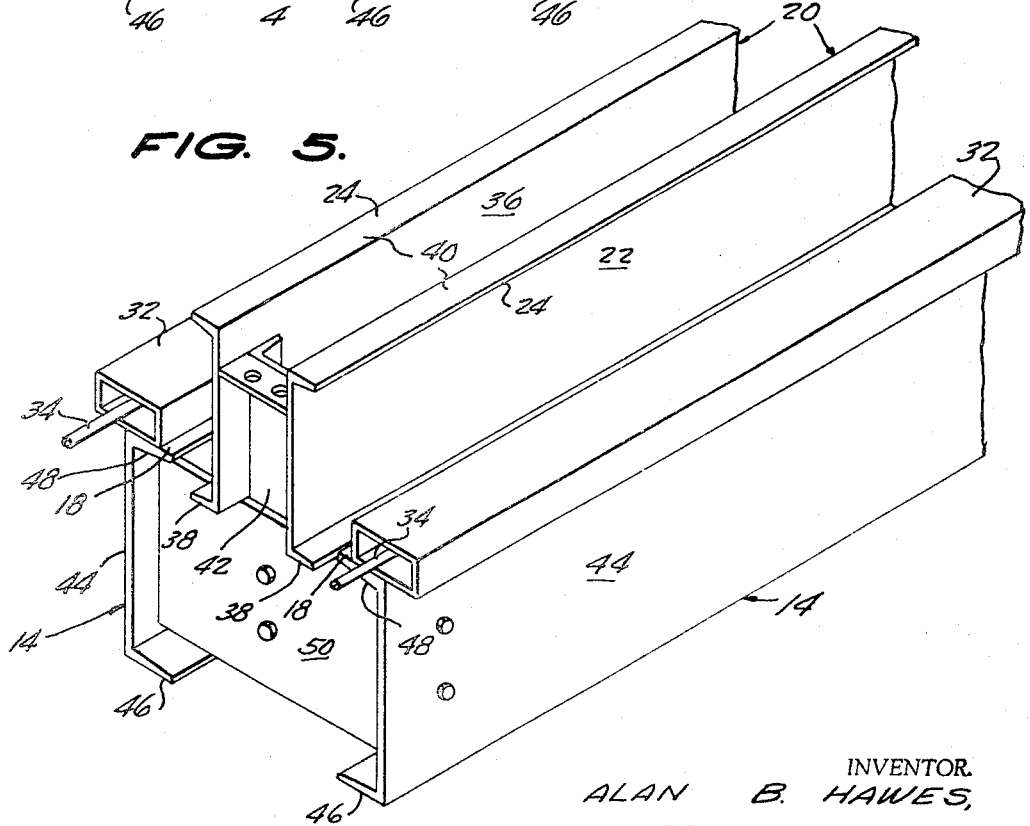

Oct. 15, 1968   A. B. HAWES   3,405,650
MONORAIL TRAIN
Filed Jan. 14, 1966   4 Sheets-Sheet 3

INVENTOR.
ALAN B. HAWES,
BY
Berman, Davidson & Berman
ATTORNEYS.

Oct. 15, 1968 A. B. HAWES 3,405,650
MONORAIL TRAIN
Filed Jan. 14, 1966 4 Sheets-Sheet 4
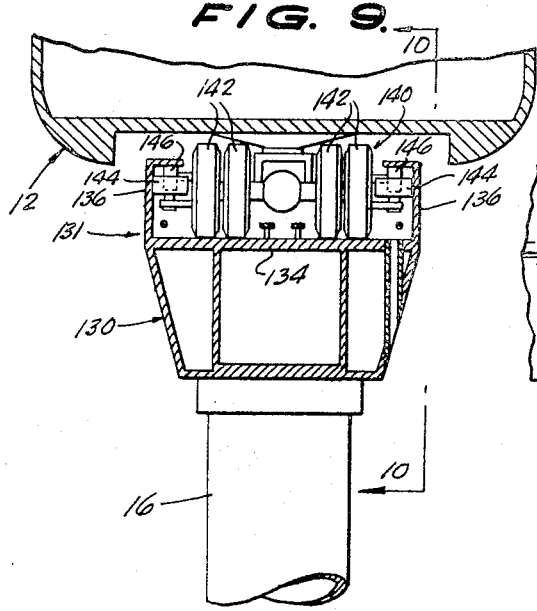
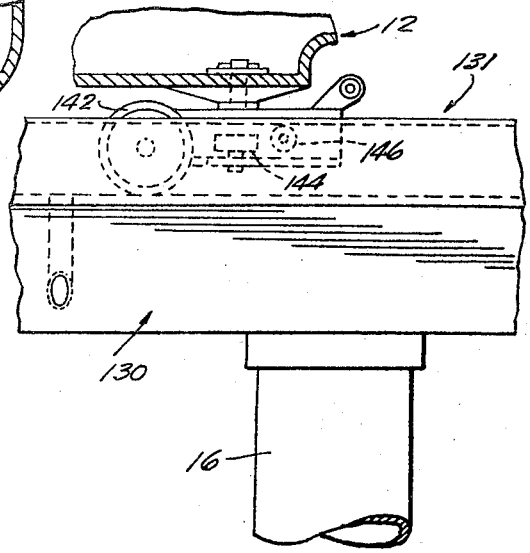
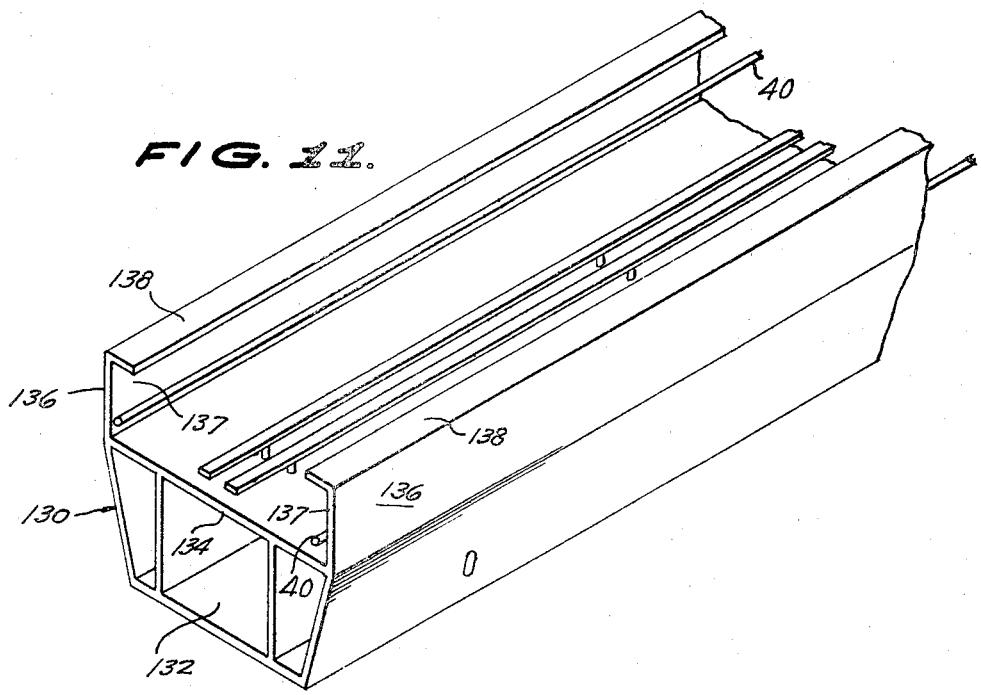
INVENTOR.
ALAN B. HAWES,
BY
Berman, Davidson & Berman
ATTORNEYS.

United States Patent Office 3,405,650
Patented Oct. 15, 1968

3,405,650
MONORAIL TRAIN
Alan B. Hawes, 8504 Seaview Ave.,
Wildwood Crest, N.J. 08260
Filed Jan. 14, 1966, Ser. No. 520,583
9 Claims. (Cl. 104—119)

ABSTRACT OF THE DISCLOSURE

The invention provides a combination of a monorail and a passenger train car mounted thereon, said monorail comprising an upstanding elongated metal base fixedly supported upon a plurality of spaced transverse standards, said base having a pair of horizontal surfaces in the same plane adapted for rolling engagement with a pair of vertical drive wheels of said car, a pair of laterally spaced upright members rising from said base and extending above said horizontal surface, said members having opposed vertical surfaces which are adapted for rolling engagement with horizontal guide wheels of said car and which have upper horizontal flanges projecting from the top thereof, transverse metal members terminating below said horizontal flanges and secured to and fixing said horizontal surfaces and upright members together to form a unitary monorail and defining a protection channel between the upright members, a pair of electric power conductors insulatedly mounted in said channel and extending longitudinally thereof, said passenger train car having a pair of spaced horizontal guide wheels cooperatively disposed with respect to a pair of laterally spaced vertical drive wheels, said guide wheels being adapted to engage said vertical surfaces and being retained in rolling engagement therewith by said outwardly projecting flanges thereon.

---

This invention relates to a monorail train, and more particularly to the monorail and the truck carried by the train car in operative association therewith.

An object fo the present invention is to provide a monorail and train car truck assembly which lends itself to ready erection and which is of sturdy construction.

Another object of the present invention is to provide a monorail and train car truck assembly which is positive in action, highly efficient in operation, and commercially feasible.

A further object of the present invention is to provide a monorail and train car truck assembly in which the horizontal surface on the monorail is adapted for rolling driving engagement with drive wheels and the truck is provided with heatable tracks with which the drive wheels are in rolling driving engagement.

Other objects and advantages of the present invention will become apparent from the following description taken in conjunction with the accompanying drawings, in which:

FIGURE 1 is a semi-diagrammatic side elevation of a part monorail train constructed in accordance with the present invention, with parts broken away to show interior details.

FIGURE 2 is an end elevation taken on the line 2—2 of FIGURE 1.

FIGURE 3 is an enlarged cross-sectional view taken on the line 3—3 of FIGURE 1.

FIGURE 4 is a fragmentary sectional view taken on the line 4—4 of FIGURE 3.

FIGURE 5 is an enlarged perspective view of the monorail of the assembly of FIGURE 1.

FIGURE 9 is an enlarged cross-sectional view of a fourth modified form of the monorail and train car truck assembly of FIGURE 3.

FIGURE 10 is a side elevational view taken on the line 10—10 of FIGURE 9.

FIGURE 11 is an enlarged perspective view of the monorail of the assembly of FIGURE 9.

Figure 6:
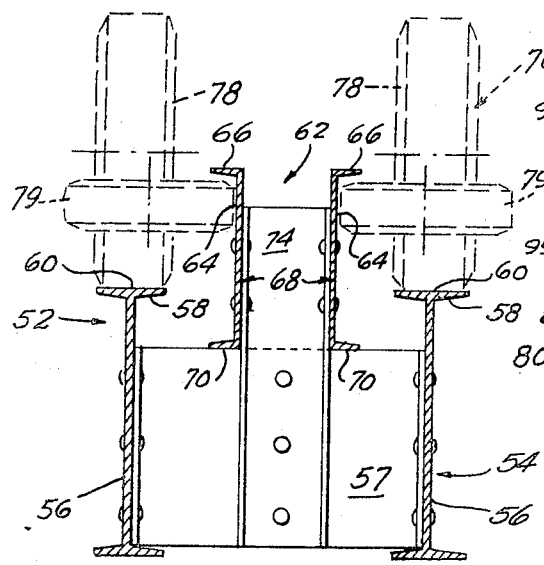
FIGURE 6 is an enlarged cross-sectional view of the first modified form of the monorail and train car truck assembly of FIGURE 3.

Referring to FIGURES 1 to 5, the numeral 10 designates generally a monorail on which is mounted a plurality of passenger train cars 12 for travel therealong. The monorail 10 comprises an upstanding base 14 which is fixedly supported upon a plurality of spaced standards 16, only one being partially shown in FIGURE 1.

The base 14 of the monorail 10 has a horizontal surface 18 which is adapted for rolling engagement with drive wheels. Rising from the base 14 and extending above the horizontal surface 18 is an upright member 20, the member 20 being provided with opposed vertical surfaces 22 which are adapted for rolling engagement with guide wheels and which has horizontal flanges 24 projecting from the top of the member.

Each train car 12 carries a truck 26 at the front and rear ends thereof, only the front car showing the trucks 26 at the front and rear ends thereof with the car 12 directly behind the front car showing only the truck 26 at the front end thereof. Each of the trucks 26 at the rear end of the cars 12 includes at least a pair of spaced vertical rotatable drive wheels 28 which are in driving rolling engagement with the horizontal surface 18, and at least a pair of spaced horizontal rotatable guide wheels 30 cooperatively disposed with respect to the drive wheels 28, the guide wheels 30 being located contiguous to and are adapted to engage at times the vertical surfaces 22 in rolling engagement therewith inwardly and below the flanges 24. It is to be noted that the truck 26 at the front end of the train car 12, which is fully shown in FIGURE 1, carries a pair of spaced vertical rotatable wheels 28 which are merely in free rolling engagement with the horizontal surface 18.

The horizontal surface 18 of the base 14 of the monorail 10, FIGURES 3, 4 and 5, embodies a pair of laterally spaced hollow tracks 32 which are fixedly supported thereon with heating means or a conductive rod 34 disposed within each track and extending longitudinally therealong. The opposed vertical surfaces 22 comprise the outer faces of the webs of a first pair of channel elements 36 arranged in spaced upright position with the foot and top flanges 38 and 24 facing away from each other, the channel elements being fixedly secured together in spaced relation by cross-spacer plates 42.

The base 14 of the monorail 10 comprises a second pair of channel elements 44 arranged in spaced upright position with the foot and top flanges 46 and 48 facing toward each other, the hollow tracks 32 being supported upon and extending along the top flanges 48 of the second pair of channel elements 44. The channel elements 44 are fixedly-secured together in spaced relation by cross-spacer plates 50.

Shown protectively bounded in a channel between the upright members 20 are a pair of electric conductors 40, adapted to lead power to the truck drive wheel motors, not shown, and mounted on insulated supports 41. It will be obvious that said electric conductors are intended to be supported in like manner in the modified embodiments to be described, even though omitted from the drawings illustrating certain of the embodiments.

In the assembly of FIGURE 6, the base 54 of the monorail 52 comprises a pair of I-beams 56 arranged in spaced upright position with the top flanges 58 constituting a pair of spaced aligned horizontal surfaces 60 which are adapted for driving rolling engagement with drive wheels. The beams 56 are fixedly-secured together in spaced relation by cross-spacer plates 57. The base 54 also includes a fixed upright member 62 which rises therefrom and extends above the horizontal surfaces 60, the member 62 being provided with opposed vertical surfaces 64 which are adapted for rolling engagement with guide wheels and which have horizontal flanges 66 projecting from the top thereof. The opposed vertical surfaces 64 comprise the outer faces of the webs of a pair of channel elements 68 arranged in spaced upright position with the foot and top flanges 70 and 66 facing outwardly and away from each other, the channel elements 68 being fixedly-secured together in spaced relation by cross-spacer plates 74. The truck 76 at the rear end of the cars 12 includes at least a pair of spaced vertical rotatable drive wheels 78 which are in driving rolling engagement with the spaced horizontal surfaces 60, and at least a pair of spaced horizontal rotatable guide wheels 79 which are located contiguous to and are adapted to engage at times the vertical surfaces 64 in rolling engagement therewith inwardly of the flanges 66.

Figure 7:
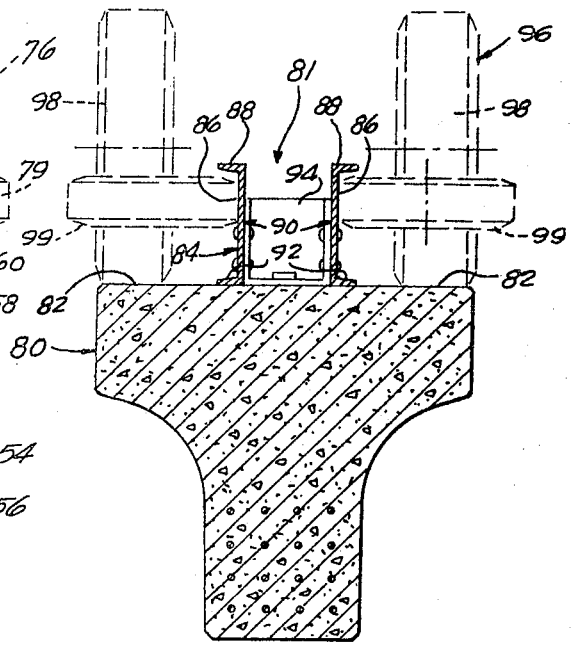
FIGURE 7 is an enlarged cross-sectional view of a second modified form of the monorail and train car truck assembly of FIGURE 3.

With reference to the assembly of FIGURE 7, the base 80 of the mono-rail 81 is fabricated of concrete and is of one-piece construction with the top constituting the horizontal surface 82 which is adapted for rolling engagement with drive wheels. The base 80 also includes a fixed upright member 84 which rises therefrom and extends above the horizontal surface 82, the member 84 being provided with opposed vertical surfaces 86 which are adapted for rolling engagement with guide wheels and which have horizontal flanges 88 projecting from the top thereof. The opposed vertical surfaces 86 comprise the outer faces of the webs of a pair of channel elements 90 arranged in spaced upright position with the foot and top flanges 92 and 88 facing away from each other, the channel elements 90 being fixedly-secured together in spaced relation by cross-spacer plates 94. The truck 96 at the rear end of the cars 12 includes at least a pair of spaced vertical rotatable drive wheels 98 which are in driving rolling engagement with the horizontal surface 82, and at least a pair of spaced horizontal rotatable guide wheels 99 which are located contiguous to and are adapted to engage at times the vertical surfaces 86 in rolling engagement therewith inwardly of the top flanges 88.

Figure 8:
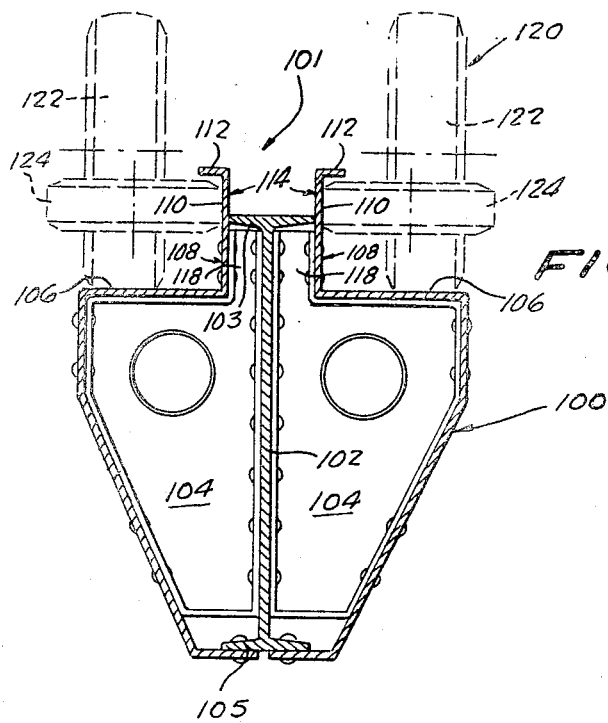
FIGURE 8 is an enlarged cross-sectional view of a third modified form of the monorail and train car truck assembly of FIGURE 3.

Reverting to the assembly of FIGURE 8, the base 100 of the monorail 101 is of hollow apertured construction and includes an upright I-beam 102 and an apertured half-hollow wing section 104 disposed on each side of the beam 102 and fixedly-attached to the web of the beam 102, with the lower ends of the wing sections attached to the foot flange 105 of the beam 102. The base 100 also includes a fixed upright member 108 which rises therefrom, the member 108 being provided with opposed vertical surfaces 110 which are adapted for rolling engagement with guide wheels and which have horizontal flanges 112 projecting from the top thereof. The opposed vertical surfaces 110 comprise the outer faces of the webs of a pair of channel elements 114 arranged in spaced upright position with the top flanges 112 facing away from each other. It is to be noted that the foot flanges of the channel elements 114 are integral with the horizontal surfaces 106. The top flange 103 of the beam 102 is received between the webs of a pair of channel elements 114, the channel elements 114 being fixedly-secured to extensions 118 rising from the tops of the wing sections 104 which are fixedly attached to the portion of the web of the beam 102 below and adjacent the top flange 103. The portions of the tops of the wing sections 104 outwardly of the top flanges 112 of the channel elements 114 constitute horizontal surfaces 106 which are adapted for rolling engagement with drive wheels. The truck 120 at the rear end of the cars 12 includes at least a pair of spaced vertical rotatable drive wheels 122 which are in driving rolling engagement with the horizontal surfaces 106, and at least a pair of spaced horizontal rotatable guide wheels 124 which are located contiguous to and are adapted to engage at times the vertical surfaces 110 in rolling engagement therewith inwardly of the top flanges 112.

In the assembly of FIGURES 9 to 11, the base 130 of the monorail 131 comprises an apertured hollow partitioned enclosure 132 which has a flat horizontal surface 134 extending over the top thereof, the surface 134 being adapted for rolling engagement with drive wheels. The enclosure 132 has an upright backing 136 which rises from the top surface 134 and extends along each of the side edges thereof. A horizontal flange 138 extends along the top of each backing 136 and projects inwardly, the flanges 138 facing toward each other. The inner faces of the backings 136 constitute a pair of spaced vertical surfaces 137 which are adapted for rolling engagement with guide wheels. The truck 140 at the rear end of the cars 12 includes at least two pairs of vertical rotatable drive wheels 142 arranged in transverse spaced relation and drivingly connected together which are in driving rolling engagement with the horizontal surface 134, and at least a pair of spaced horizontal rotatable guide wheels 144 which are located contiguous to and are adapted to engage at times the vertical surfaces 136 in rolling engagement therewith inwardly of the horizontal flanges 138, and a pair of vertical auxiliary stabilizing wheels 146 which are located contiguous to and are adapted to engage at times the inner faces of the flanges 138 of the backings 136 in rolling engagement therewith.

What is claimed is:

1. The combination with a monorail, of a passenger train car mounted on said rail for travel therealong, said monorail comprising an upstanding elongated metal base fixedly supported upon a plurality of spaced transverse standards, said base having a pair of horizontal surfaces in the same plane adapted for rolling engagement with a pair of vertical drive wheels, a pair of laterally spaced upright members rising from said base and extending above said horizontal surface, said members having opposed vertical surfaces adapted for rolling engagement with horizontal guide wheels, and provided with upper horizontal flanges projecting from the top thereof, transverse metal members terminating below said horizontal flanges of the upright members and secured to and fixing said horizontal surfaces and upright members together to form a unitary monorail, said transverse metal members defining a protection channel with and between the upright members, a pair of electric power conductors insulatedly mounted in said channel and extending longitudinally thereof, said train carrying a truck including at least a pair of spaced vertical rotatable drive wheels which are in rolling engagement with the horizontal surfaces, and at least a pair of spaced horizontal guide wheels cooperatively disposed with respect to said drive wheels and which are located contiguous to and are adapted to engage the vertical surfaces in rolling engagement therewith inwardly and below said flanges.

2. The combination according to claim 1, wherein said horizontal surfaces embody a pair of laterally spaced hollow tracks fixedly supported thereon with heating means disposed within and extending longitudinally therealong.

3. The combination according to claim 1, wherein said opposed vertical surfaces comprise the outer faces of the webs of a first pair of channel elements arranged in spaced upright position with the foot and top flanges facing away from each other, the channel elements being fixedly secured together in spaced relation.

4. The combination according to claim 3, wherein said base comprises a second pair of channel elements arranged in spaced upright position with the foot and top flanges facing toward each other, said tracks being supported upon and extending along the top flanges of said second pair of channel elements.

5. The combination according to claim 3, wherein said base comprises a pair of I-beams arranged in spaced upright position with the top flanges of said beams constituting said pair of spaced horizontal aligned surfaces adapted for rolling engagement with drive wheels, and wherein said pair of vertical drive wheels are in rolling engagement wtih said pair of horizontal surfaces.

6. The combination according to claim 3, wherein said base is of one-piece construction with the top thereof constituting the said horizontal surfaces adapted for rolling engagement with drive wheels, and wherein said pair of vertical drive wheels are in rolling engagement with said horizontal surface.

7. The combination according to claim 3, wherein said base is of hollow apertured construction and includes an upright I beam and an apertured half-hollow, integral wing section disposed on each side of said beam and incorporating one of said first pair of channel elements as an integral part thereof, the top flange of said beam being received between the webs of said pair of channel elements with a portion of the web of said beam in upstanding extensions arising from the wing sections being secured to the webs of said pair of channel elements by said transverse metal members, the lower flange portions of said channel elements being extended outwardly of the top flanges of said channel elements to constitute said pair of spaced horizontal surfaces adapted for rolling engagement with the drive wheels, and wherein said pair of vertical drive wheels are in rolling engagement with said pair of horizontal surfaces, the outer edges of said horizontal surfaces being extended downwardly in vertical sections, inwardly in inclined sections and inwardly in horizontal lower sections which are secured to the bottom flange of said I-beam.

8. The combination according to claim 3, wherein said base is an integral, apertured hollow partition enclosure with a flat horizontal surface extending over the top thereof and including said horizontal surfaces for engagement with said drive wheels, said enclosure having an upright backing rising from the top and extending along each of the side edges thereof and forming said upright member and a horizontal flange extending along the top of each backing and projecting inwardly, the flanges facing toward each other, the inner facings of the backings constituting said pair of spaced vertical surfaces adapted for rolling engagement with horizontal guide wheels, and wherein said vertical drive wheels of the truck comprise at least two pairs of vertical drive wheels arranged in transverse spaced relation and drivingly connected together, said pairs of vertical drive wheels being in driving rolling engagement with said flat horizontal surface with a pair of horizontal guide wheels in rolling engagement with said pair of spaced vertical surfaces.

9. The combination according to claim 8, wherein said truck includes in addition a pair of vertical auxiliary stabilizing wheels which are located contiguous to and are adapted to engage at times the inner faces of the top flanges of said backings in rolling engagement therewith.

References Cited

UNITED STATES PATENTS

| | | | |
|---|---|---|---|
| 695,137 | 3/1902 | Beecher | 104—120 |
| 1,238,276 | 8/1917 | Dickson | 104—243 |
| 1,329,304 | 1/1920 | McClure | 104—118 |
| 1,501,060 | 7/1924 | Miller | 104—247 |
| 3,148,632 | 9/1964 | Bingham | 104—120 |
| 3,216,371 | 11/1965 | Holmquist et al. | 104—120 |

FOREIGN PATENTS

| | | |
|---|---|---|
| 8,030 | 1903 | Great Britain. |

ARTHUR L. LA POINT, *Primary Examiner.*

R. A. BERTSCH, *Assistant Examiner.*